US010951463B2

(12) United States Patent
Heitz et al.

(10) Patent No.: US 10,951,463 B2
(45) Date of Patent: Mar. 16, 2021

(54) BGP AGGREGATION IN CLOS NETWORKS

(71) Applicant: Cisco Technology, Inc., San Jose, CA (US)

(72) Inventors: Jakob Heitz, Santa Clara, CA (US); Dhananjaya Kasargod Rao, Sunnyvale, CA (US); Pascal Thubert, Roquefort les Pins (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/366,053

(22) Filed: Mar. 27, 2019

(65) Prior Publication Data

US 2020/0313956 A1 Oct. 1, 2020

(51) Int. Cl.

*H04L 12/24* (2006.01)
*H04L 12/703* (2013.01)
*H04L 12/933* (2013.01)
*H04L 12/745* (2013.01)

(52) U.S. Cl.

CPC ...... *H04L 41/0668* (2013.01); *H04L 41/0677* (2013.01); *H04L 45/28* (2013.01); *H04L 45/748* (2013.01); *H04L 49/1569* (2013.01)

(58) Field of Classification Search

None

See application file for complete search history.

(56) References Cited

U.S. PATENT DOCUMENTS 7,978,708 B2 * 7/2011 Filsfils .................... H04L 45/04 370/395.31
10,374,956 B1 * 8/2019 Tracy .................. H04L 41/0853
2013/0088999 A1 * 4/2013 Thubert ............. H04W 40/248 370/254
2016/0173323 A1 * 6/2016 Scholl .................. H04L 45/245 370/221

(Continued)

OTHER PUBLICATIONS

International Search Report and Written Opinion from the International Searching Authority, dated Jun. 2, 2020, 12 pages, for corresponding International Patent Application No. PCT/US2020/024590.

(Continued)

*Primary Examiner* — Steve R Young
(74) *Attorney, Agent, or Firm* — Polsinelli PC

(57) ABSTRACT

The present disclosure provides Border Gateway Protocol route aggregation in a Clos fabric when one or more communication failures are detected. A method includes receiving a prefix component of a first aggregate route from a first next hop node, the prefix component being associated with a failed network element; announcing, to one or more neighboring nodes, the first aggregate route along with the prefix component and the first next hop node associated with the failed network element; identifying, by the one or more neighboring nodes, a second aggregate route, the second aggregate route being a shortest aggregate route that contains the first aggregate route; and generating, from the second aggregate route, one or more Chad routes to the (Continued)

100 prefix component of the first aggregate route, wherein the one or more Chad routes are associated with one or more next hop nodes that are different from the first next hop node.

20 Claims, 6 Drawing Sheets

(56) References Cited

U.S. PATENT DOCUMENTS

| | | | | |
|---|---|---|---|---|
| 2019/0149896 | A1* | 5/2019 | Grammel | H04L 41/0816 398/3 |
| 2019/0260504 | A1* | 8/2019 | Philip | H04L 1/0045 |
| 2020/0067823 | A1* | 2/2020 | Malhotra | G06F 16/278 |
| 2020/0259746 | A1* | 8/2020 | Thubert | H04L 41/16 |

OTHER PUBLICATIONS

Heitz, Jakob, et al., "Aggregating BGP routes in Massive Scale Data Centers," draft-heitz-idr-msdc-bgp-aggregation-00, Oct. 22, 2018, 9 pages.

Przygienda, T., et al., "RIFT: Routing in Fat Trees," draft-przygienda-rift-01, Jan. 24, 2017, 39 pages.

* cited by examiner

BGP AGGREGATION IN CLOS NETWORKS

TECHNICAL FIELD

The subject matter of this disclosure relates in general to the field of computer networking, and more particularly, to systems and methods for ensuring accurate traffic routing in a data center in light of possible communication failures.

BACKGROUND

Data center networks have become massively large in order to meet data processing demands. This enlargement raises various scaling challenges in terms of forwarding table size for each node in a network, control plane information flooding, network convergence, etc. Various proposals are underway for addressing the above challenges. For example, Intermediate System (ISIS) Spine Leaf (ISIS-SL) (Spine-Leaf), Routing in Fat Trees (RIFT), etc. are few of the proposals to address the challenges in data center routing.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
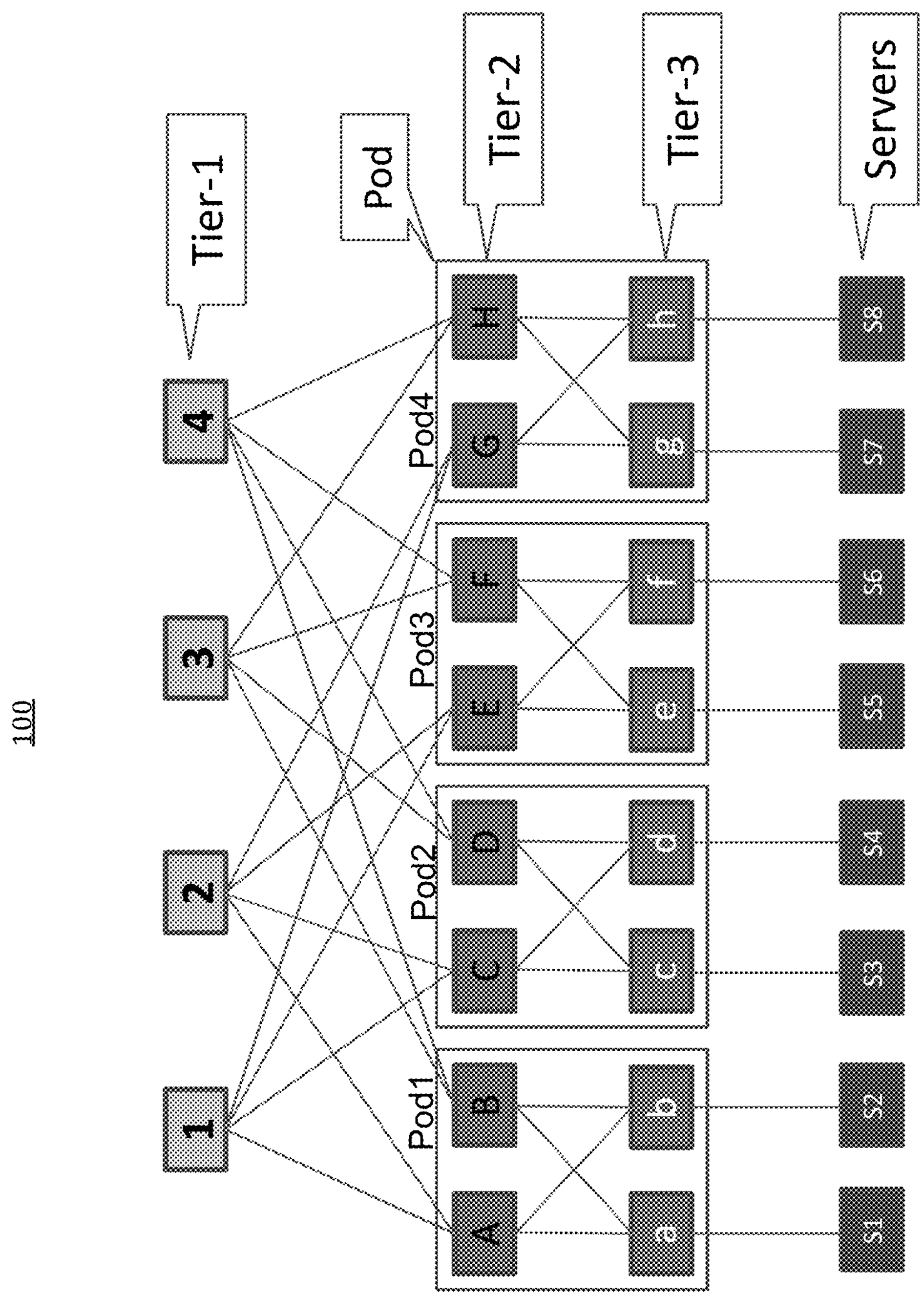
FIG. 1 illustrates an example of connectivity pattern in a Clos Fabric, according to one aspect of the present disclosure.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some example embodiments and not by others.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

The present disclosure provides a unique method of implementing BGP route aggregation in a multi-Tier vertically connected network (i.e., Clos network) that safeguards against route black-holing in the event of one or more network link and/or node failures.

In one aspect, a method includes receiving, by a first node, a prefix component of a first aggregate route from a first next hop node, wherein the prefix component is associated with a failed network element; announcing, to one or more neighboring nodes, the first aggregate route along with the prefix component and the first next hop node associated with the failed network element; identifying, by the one or more neighboring nodes, a second aggregate route, wherein the second aggregate route is a shortest aggregate route that contains the first aggregate route; and generating, from the second aggregate route, one or more Chad routes to the prefix component of the first aggregate route, wherein the one or more Chad routes are associated with one or more next hop nodes that are different from the first next hop node.

In one aspect, a system comprises one or more network nodes, the system further comprises one or more processors; and at least one computer-readable storage medium having stored therein instructions which, when executed by the one or more processors, cause the one or more processors to: determine an unreachable prefix component of a first aggregate route received by a first network node from one or more first next hop nodes; announce, to one or more neighboring nodes, the first aggregate route along with the unreachable prefix component and the one or more first next hop nodes associated with the unreachable prefix component; identify, by the one or more neighboring nodes, a second aggregate route, wherein the second aggregate route is a shortest aggregate route that contains the first aggregate route; and generate, from the second aggregate route, one or more Chad routes to the unreachable prefix component of the first aggregate route, wherein the one or more Chad routes are associated with one or more next hop nodes that are different from the one or more next first next hop nodes.

DETAILED DESCRIPTION

An important attribute of Clos topology that makes it suitable as a switching fabric for implementing interconnectivity in a Data center (DC) is that it is statistically non-blocking. In other words, there is always an interconnecting path available between any two active and available leaf nodes serve as access points to one or more network devices or servers. This is achieved by implementing an Equal Cost Multi Path (ECMP) as load sharing mechanism between each tier within the Clos topology. Effectively, every lower-Tier device will use all of its directly attached upper-Tier devices to load share traffic destined to the same IP prefix. Number of ECMP paths between any two bottom tier (leaf node) devices in Clos topology equals to the number of the devices in the middle stage (Tier-1). In other words each node disposed at tier-x within a Clos topology, connects to every pod at tier-(x+1). For example, FIG. 1 illustrates an example Clos-based topology 100 wherein each of the network server (s1-s8), connected to respective leaf nodes a-h, has multiple available paths to reach every other non-local server (i.e., not housed within the same pod as the transmitting server), via mid-tier (i.e.,Tier-2) devices A-H and then top-tier (i.e., Tier-1) devices 1, 2, 3, and 4 respectively.

A massive scale data centers connected in accordance to Clos switching topology housing up to a million servers will consist of between 35000 and 130000 switches and 1.5 million to 8 million links, depending on how redundantly the servers are connected to the fabric and the level of over-subscription in the fabric. A switch that needs to store, send and operate on millions of links may be significantly more costly than a switch which needs to operate on hundreds of routes. One way of addressing the reachability and routing traffic challenge associated with massive scale data networks is to perform route-aggregation which is the process of grouping a large address space into a single address prefix. With route aggregation instead of announcing a plurality of more specific individual routes, a single aggregate or summary route that covers the more specific routes maybe advertised. As long as there is a component route (the more specific route) available in the routing table, the aggregate route (the less specific route) may be advertised to neighbors speaking the same routing protocol such as Border Gateway Protocol (BGP). As such, a switch running BGP and aggregating its routes, in a Clos network, needs to send only one route to advertise reachability for all its southbound connected nodes. In the ideal case, each switch receives just one route from each of its neighbors.

In a Clos network all northbound links can reach all destinations and there is typically only one or very few southbound links to reach any specific destination. Therefore, traffic from source network device to a destination network device may be spread to all available northbound links, to reach one or more of the top-tier nodes (i.e. spine node) and then concentrates southbound towards its destination. When a link fails in a Clos network, a top-tier spine node may lose connectivity to some of the southbound leaf node destinations. That means any northbound link to that spine also loses connectivity to the same destinations. As such, an attribute of Clos topology is that each top tier node may have one path to every server connected to a leaf node at the bottom tier of the topology. This feature renders route summarization a risky implementation for a Clos fabric.

Accordingly, server subnets connected at the bottom-tier (i.e., connected to the leaf nodes in a Clos fabric)) may be announced into BGP without using route summarization on mid-tier (Tier-2) and top-tier (Tier-1) devices. This is because summarizing subnets in a Clos topology may result in route black-holing under a single link failure (e.g. between Tier-2 and Tier-3 devices) and is hence generally avoided. However, considering that a Clos topology features a large number of point-to-point links and associated prefixes, advertising all of these routes into BGP may create FIB overload conditions in the network devices and puts additional path computation stress on the BGP control plane.

The current general practice is for the Server subnets on leaf nodes devices to be announced into BGP without using route summarization on Tier-2 and Tier-1 devices. As mentioned before, this is because summarizing subnets in a Clos topology results in route black-holing under a single link failure (e.g. between Tier-2 and Tier-3 devices) and therefore, the conventional recommendation is that it be avoided. Routing black holes occur when traffic destined to or originating from a particular network prefix, via the failed link and/or a failed intermediate node, arrives and remain at the failed intermediate node without being delivered to its intended destination due to the failure.

From a perspective of network performance and deployment/operation cost, it is often desirable to summarize network reachability information prior to advertising it to the WAN network due to high amount of IP prefixes originated from within the data center in a fully routed network design such as a Clos switching fabric. For example, a network with 2000 Tier-3 devices will have at least 2000 servers subnets advertised into BGP, along with the infrastructure or other prefixes. The main problem, preventing the down-scaling of such large number of route announcements in Clos network by using aggregate or summary route announcement, is the limited number of redundant paths between network elements, e.g. there is only a single path between any pair of Tier-1 and Tier-3 devices. Route summarization may be possible with modifications to the network topology, though the trade-off would be reduction of the total size of the network as well as network congestion under specific failures. If aggregation of routing and reachability information is to be utilized in a Clos network for the many advantages it can offer, then, an automatic disaggregation scheme in the events of link/node failure may be required to prevent route Black-Holing.

In other words, when a Clos fabric is fully connected with no failed links, then the forwarding tables of the interconnecting switches can simply contain multipath aggregate routes to all the northbound links. Each of the multipath routes is the same, so traffic is spread out smoothly among these routes. As soon as a link fails, the forwarding tables must exclude the resultant unreachable destinations from some of the northbound links.

One way to accomplish this, as described by some example embodiments of the present application is to add specific routes for the failed destinations to point the incoming traffic (for the failed destination) to the remaining links that can reach those destinations. Since BGP traffic will always prefer specific routes to aggregate routes, the traffic to the failed destinations will no longer take the aggregate routes.

In accordance with some example embodiments of the present disclosure, creation of the aforementioned specific routes may comprise sending a negative route from the point where the failure is detected. Receivers use the negative route to punch holes out of the aggregate routes and create the specific routes by subtracting the negative route from the aggregates. Negative route advertisement in BGP may be implemented by using BGP Hole-Punch attribute to announce the un-reachable prefix component of an aggregate or summary route.

Figure 2:
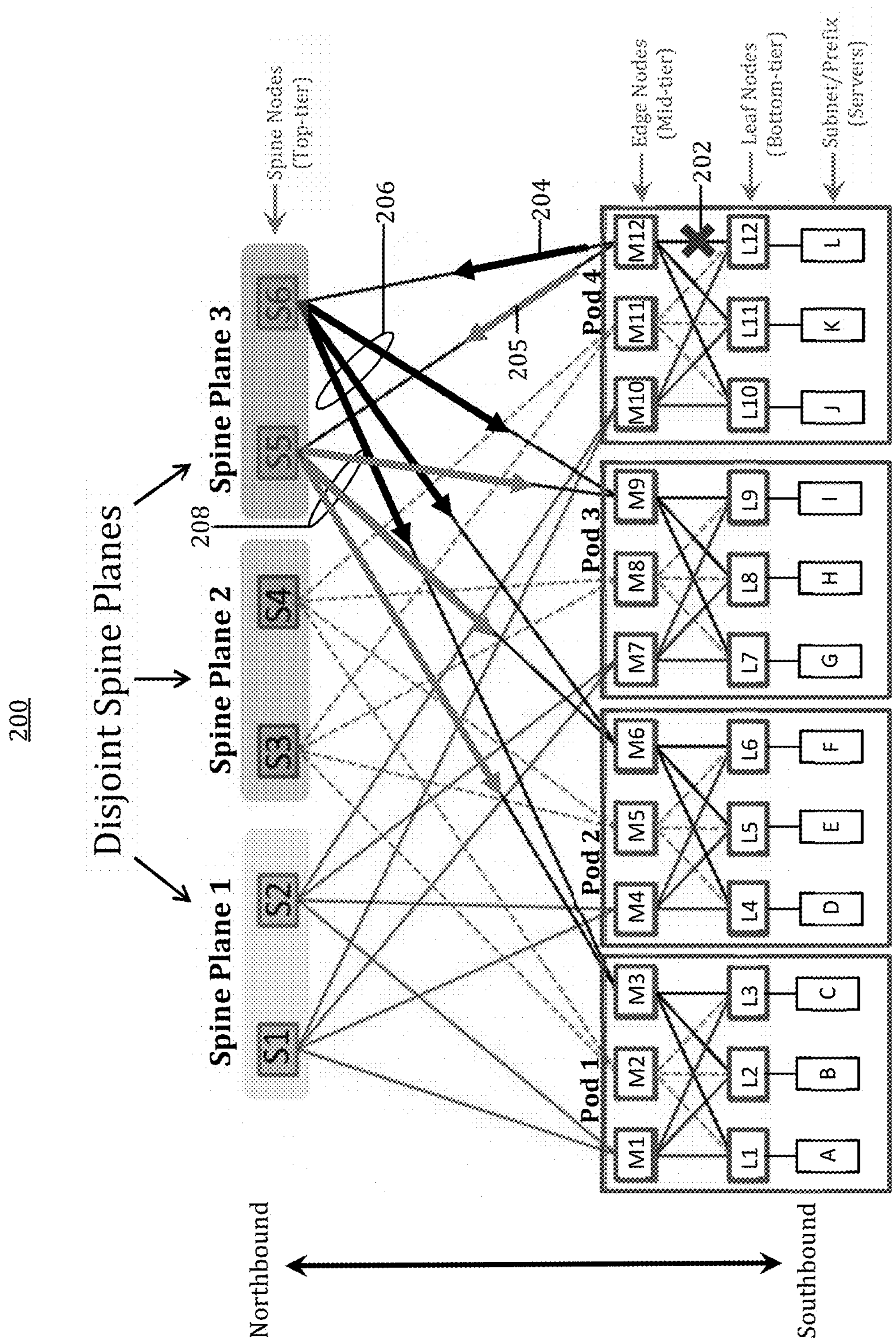
FIG. 2 illustrates an example of reachability route propagation in a three tier Clos Fabric, according to one aspect of the present disclosure.

FIG. 2 illustrates a simplified structure of a scaled network fabric using partitioned spines, with leaf nodes connected to spines in three different planes, according to one aspect of the present disclosure. Due to a size of the fabric and limitations on number of ports, spine nodes can be partitioned into different spine planes such as Spine planes 1, 2 and 3. In this non-limiting example, each of spine planes may have a number of spine nodes (e.g., 3 spine nodes in this case). In example of FIG. 2, network fabric 200 has 3 tiers of nodes. The top Tier includes spine nodes S1-S6, where spine nodes S1 and S2 are in one spine plane (Spine Plane 1), spine nodes S3 and S4 are in spine plane 2 and spine nodes S5 and S6 are in spine plane 3.

Another tier of network fabric 200 is Mid-tier that includes 12 exemplary intermediate nodes (edge switches) M1-M12. With reference to example Clos topology 200, each of the edge nodes in the mid-tier level of the example Clos network 200 are connected to all the Spine nodes residing in one spine plane. Edge nodes M1, M4, M7 and M10 are each connected to both Spine Nodes S1 and S2 in the Spine plane 1. Edge nodes M2, M5, M8 and M11 are each connected to both Spine Nodes S3 and S4 in the Spine plane 2. Finally, edge nodes M3, M6, M9 and M12 are each connected to both Spine Nodes S5 and S6 in the Spine plane 1.

FIG. 2 also illustrates a number of Pods 1-4 housing a set of mid-tier edge nodes and bottom-tier leaf nodes along with the corresponding servers connected to respective leaf nodes. A pod may be defined as at least a 2 layer vertical structure in which a number of top of the rack switches (leaf nodes) are connected to one or more edge switches. At the bottom-tier of the Clos topology 200 are the leaf nodes L1-L12 that are respectively connected to networks/prefixes A-L, in the southbound direction and the corresponding mid-tier edge nodes M1-M12 in the northbound direction. The Mid-tier and bottom tier nodes (Edge and Leaf) along with the connected networks/prefixes are housed in one of four pods 1-4. The northbound connections comprise Equal Cost Multi Paths (ECMPs).

In the example Clos topology 200, each node has Equal Cost Multi Path (ECMP) connectivity to a tier above it. For example each leaf node (L1-L12) has ECMP redundant connectivity to corresponding Mid-tier node (M1-M12). Similarly each mid-tier node has ECMP connectivity to every Spine node in a particular Spine plane. Accordingly each server Pod 1-4 comprising of three mid-tier switches provides northbound connectivity across each Spine node in every Spine plane for each of its member leaf nodes. However, there is only one path from every top tier node (Spine node) to every bottom tier node (leaf node)

Furthermore, each of leaf nodes L1, L2, L3, L4, L5 and L6 are shown to have at least one network prefix of a device accessible there through. For example, network prefix A is accessible via (associated with) L1, network prefix B is accessible via (associated with) L2, network prefix C is accessible via (associated with) L3, network prefix D is accessible via (associated with) L4, network prefix E is accessible via (associated with) L5 and network prefix F is accessible via (associated with) L6. While only a single prefix is shown in association with each leaf node, the present disclosure is not limited thereto and there can be multiple (e.g., tens of, hundreds of, thousands of) prefixes accessible via a given leaf node.

As mentioned earlier, a massive scale Data Center deployment comprising of tens of thousands of servers redundantly interconnected with ECMPs will require hundreds of thousands of inter-switch links and a proportional number of link states that must be propagated by the implemented routing protocol. With aggregation the number of routes required on each node is one route for each of its immediate southbound neighbors and the aggregate route sent by each of its immediate southbound neighbors. For example each Bottom-Tier leaf node sends an aggregate route that encompasses the network address for its servers plus a loopback IP as a local source address to its immediate northbound Mid-tier edge node. Similarly, each Mid-tier edge node aggregates all the routes sent to it from its southbound bottom-tier leaf nodes into a single aggregate route and sends the aggregate route plus a local source address (i.e., loopback interface IP) to its immediate northbound top-tier node. Every Mid-Tier switch in the same pod sends the same prefix (aggregated route) north. Each Top-tier switch received one aggregated prefix from each of its directly connected southbound mid-tier neighbor along with a loopback address for the same.

FIG. 2 illustrates an example to show the challenge involved in BGP route summarization in a Clos network. Referring back to FIG. 2. Mid-tier switch M12 receives prefix/subnets J, K and L respectively propagated by Leaf nodes L10, L11 and L12 and generates a single aggregate route that encompasses all the received prefixes from its directly connected southbound neighbors and sends the same aggregate route, along respective paths 204 and 205, to its directly connected northbound top-tier neighbors S5 and S6. However, in the event of a link failure 202 Between Leaf node L12 and edge node M12, M12 will continue to advertise an aggregate route for prefixes L, K and J even though it no longer has access to prefix L connected to leaf node L12. This is because a BGP aggregate route remains a valid routing table entry as long a single component of the aggregate is active. Therefore with Prefix component J and K still reachable, the aggregate route (J, K, L) will continue to be propagated northbound by edge node M12 along Equal Cost Multi Paths 204 and 205 to the top-tier spine nodes S5 and S6. The corresponding Spine nodes then propagate the aggregate route (which still contains reachability information for prefix L or Leaf node L12 through the mid-tier edge node M12) along the ECMPs 206 and 208 to the corresponding southbound edge nodes in each of the server pods 1-3. This will result in a routing black hole for the prefix L with respect to incoming traffic from any of the other prefixes in non-local pods (1-3) directed to mid-tier node M12 and destined for prefix L. In order to avoid this situation, M12 must exclude, from its advertisement of the aggregate route (J,K,L), the prefix component of the aggregate route (i.e., L) to which it no longer has access.

In a basic Clos topology, a leaf node may have many neighbors that announce the same aggregate route to it. The leaf can make an ECMP from these routes and spread the traffic evenly to all of the neighbors. After a failure, one of the neighbors can no longer reach one of the components of its aggregate route and must split the aggregate to exclude the missing component. Accordingly, a way is needed to make the leaf create ECMPs for each component of the aggregate, such that each ECMP contains exactly those neighbors that can reach the component.

In accordance to some example embodiments of the present technology, one way to create the correct Equal Cost Multi-Paths (ECMPs) for all the prefix components of an aggregate route in a Forwarding Information Base (FIB) of a switch node is to create one ECMP for the aggregate route and another ECMP for the component that one nexthop is missing.

Suppose a leaf has an aggregate route 128.10.5.0/30 (comprising of 4 IP addresses 128.10.5.0-128.10.5.3) from each of 4 neighbors A, B, C and D. In an event of one of the neighboring nodes (i.e., node B) losing connectivity to any of the route components (i.e., 128.10.5.2/32), the leaf may create two ECMPs in its forwarding table:

128.10.5.0/30, NextHop set=[A,B,C,D]

128.10.5.2/32, NextHop set=[A,C,D]

This will cause traffic to 128.10.5.2/32 to avoid the next hop B and the rest of the aggregate traffic to use all four next hops. In accordance to some example embodiments of the present disclosure, one way of initiating the aforementioned action in the leaf node is for the neighboring node B to send, in addition to its aggregate route announcement, a route announcement for the unreachable prefix (i.e., 128.10.5.2/32 component of the aggregate route 128.10.5.0/30) with a lower preference and a special community. This community is called a hole-punch community. It tells the receiving leaf node to identify an aggregate route from the other next hop neighbors that cover this missing aggregate route component (i.e., the unreachable prefix) and "punch out" routes from those aggregates to match the missing component.

Accordingly, with reference to the example above, node B additionally sends a route for 128.10.5.2/32 with a low preference and the hole-punch community. The leaf node receives this route and identifies the aggregate route 128.10.5.0/30 from the other next hop neighbors (i.e., A, C and D) that covers the hole-punch route 128.10.5.2/32. The hole-punch community tells the leaf node to create new more specific routes for the missing prefix from the aggregate route 128.10.5.0/30 through nodes A, C and D. This would cause the traffic destined to the prefix to which node has lost visibility, to be evenly distributed across nodes A, C and D. With reference to the above example, in response to receiving an announcement for the hole-punch route 128.10.5.2/32 from node B, the leaf node creates new routes for the prefix 128.10.5.2/32 with next hops A, C and D. The new routes will have the same prefix and netmask as the unreachable prefix (i.e., 128.10.5.2/32) with the path attributes copied from the corresponding aggregate route 128.10.5.0/30. These new routes are called Chad routes. The leaf node now has a set of routes with which to create the Equal Cost Multi-Path (ECMP) for 128.10.5.2/32. Note that the hole-punch route for the prefix 128.10.5.2/32 from node B was announced with a lower preference, thus it is not included in the multipath. In accordance to the described embodiment, in event of a link failure, only a single route (i.e. a hole-punch route corresponding to the prefix that is unreachable due to the link failure) needs to be announced and only to a subset of the switches in the fabric.

As described earlier, a route or prefix announced with a Hole-Punch community tells the receiving node to identity an aggregate route associated with a shorter netmask than that of the Hole-punch route (i.e., spans a larger range of IP addresses) that covers the Hole-punch route/prefix and create new routes (Chad routes) from it with the same prefix as the Hole-punch route and the same attributes as the covering route.

In order for an aggregate route to be a valid candidate for Chad route creations it must be advertised with a Punch-Accept community. If the aggregator finds that a route needed to complete the aggregate is missing, then it will send a hole-punch route for the missing route. A receiver of the hole-punch route will find punch-accept aggregate routes with alternative next hops that cover the missing route and create therefrom one or more new routes with the same prefix and netmask as the missing route. These new (Chad) routes may then provide a path to the hole-punch prefix that is as specific as the original route that became unavailable due to a link failure. In order to prevent the aggregation of Hole-Punch routes with other route, they may be announced with a Do-Not-Aggregate community.

When a switch node running a routing protocol such as Border Gateway Protocol (BGP) receives a hole-punch route, it will search up in its Routing Information base (using, for example, a compact prefix tree data structure also called a radix tree) for candidate route that covers the same address range as the hole-punch route, but with a shorter netmask. The first such route that it finds in the radix tree is designated as the punch-taken route. Subsequently, the switch node will punch chad routes out of the punch-taken route. In other words, it will create routes from all the candidate paths (i.e., ECMPs) of the punch-taken route. Each of these candidate punch-taken paths is used to create a chad path. As mentioned above, the chad path has the same prefix and netmask as the hole-punch route and the same attributes as the punch-taken path. This process is illustrated in FIG. 3.

Figure 3:
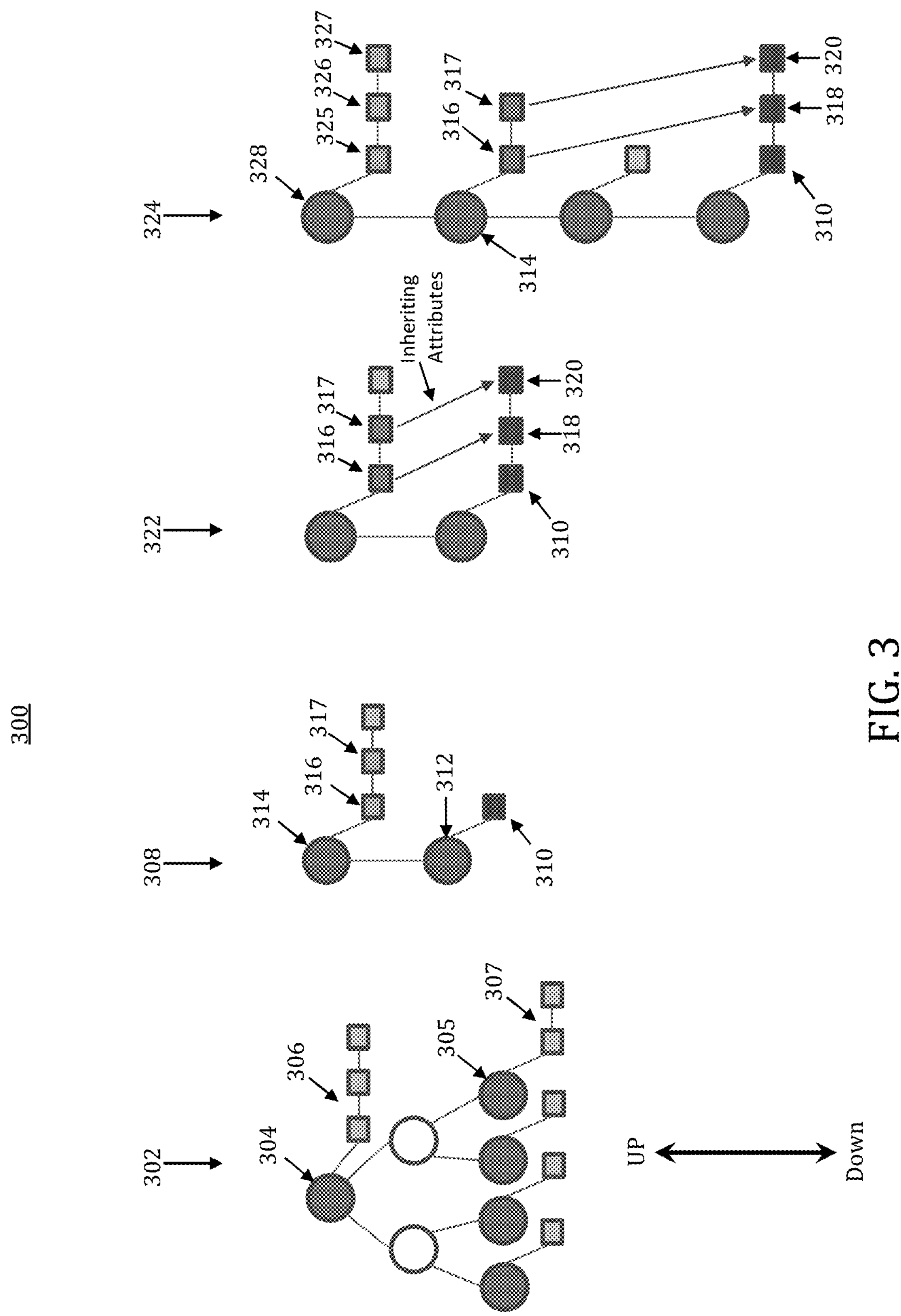
FIG. 3 illustrates an example scheme for creating Chad routes from a Hole-Punch route using a Radix tree based algorithm, according to one aspect of the present disclosure.

With reference to FIG. 3, structure 302 represents an example radix tree for identifying a prefix. In the radix tree structure 302, higher up nodes (i.e., closer to the root node in the up direction) such as 304 are associated with larger prefix address spaces (or larger aggregate routes) relative to lower down nodes (away from the root node in the down direction) such as 305 which are associated with longer net masks for more specific Prefix address space. Elements 306 represent the path list (i.e. 3 ECMPs) associated with the prefix 304. Similarly, 307 represents the path list (i.e. 2 ECMPs) associated with the prefix 305.

Turning now to structure 308, a Hole-punch route corresponding to prefix node 310 is received on a connecting path. The Receiving switch then searches up the radix tree and fmds a prefix node 314 (Punch-Accept route) which covers the more specific Hole-Punch prefix 312 and is associated with shorter netmask (less specific IP range). The candidate aggregate route corresponding to prefix node 314 is associated with Equal Cost Multi-Paths 316 and 317 which constitute the Punch-Accept paths. The switch node receiving the Hole-punch route 310 (associated with prefix node 312) finds Punch-Accept routes 316 and 317 higher in the radix tree (at prefix node 4314) and punches chad routes 318 and 320 from it. Chad routes 318 and 320 correspond to same prefix and netmask as the Hole-Punch route 310, however they inherit the attributes of the Punch-Taken routes 316 and 317, as illustrated by structure 322. Chad routes are taken from the aggregate route that is the most specific super-set of the Hole-Punch route. In other words from the smallest aggregate route, found in the Routing Information Base (RIB) of the receiving switch that still covers the Hole-Punch prefix. As shown by structure 324 this corresponds Punch-Accept routes that are closest to the hole-Punch route in the radix tree (i.e., punch-Accept routes 316 and 317 associated with prefix node 314 rather than the Punch-Accept routes 325-327 associated with Prefix node 328.

All routes are placed into the regular BGP radix tree. In addition, a new radix tree is created to store the hole-punch routes. For each hole-punch route, there is an entry in the regular tree as well as an entry in the punch tree. The punch tree may be much smaller than the regular tree in the usual case. When any candidate route is added to the regular BGP tree, the punch tree may be scanned to see if the new route can become a punch-taken route. That is: is there any hole-punch route that can be used to punch out a chad from the incoming route. Then if the hole-punch route already has chad routes, then if the netmask of the existing punch-taken routes is longer than the netmask of the incoming route, nothing is done. If the netmask of the punch-taken routes is shorter, then the existing chad routes are deleted and a new chad route is created based upon the incoming route. If the netmask is the same, then the incoming route is just another path of the existing punch-taken route. In that case, a new chad path is created.

If a punch-taken route becomes inactive or is removed from the BGP tree, then the chad routes created from it must also be removed. The chad routes are found by scanning a subtree of the punch tree. The root of that sub-tree is given by the punch-taken route's prefix. If now any hole-punch route loses all its chad paths, then that hole-punch route must search for a new punch-taken route using the same algorithm as if it were an incoming route.

Chad paths will take part in best path and multipath calculation with all the other paths of the prefix. If a chad route becomes a best path or a multipath, it will be installed in the RIB. However, chad routes are not advertised by default. That means if a chad route is best path and other routes exist for the same prefix, then no route may be advertised for that prefix. If a chad path has the same next hop (and MPLS label, if labels are used) as a hole-punch path of the same prefix, then the chad path becomes hidden. Hidden means that it cannot take part in path selection.

Figure 4:
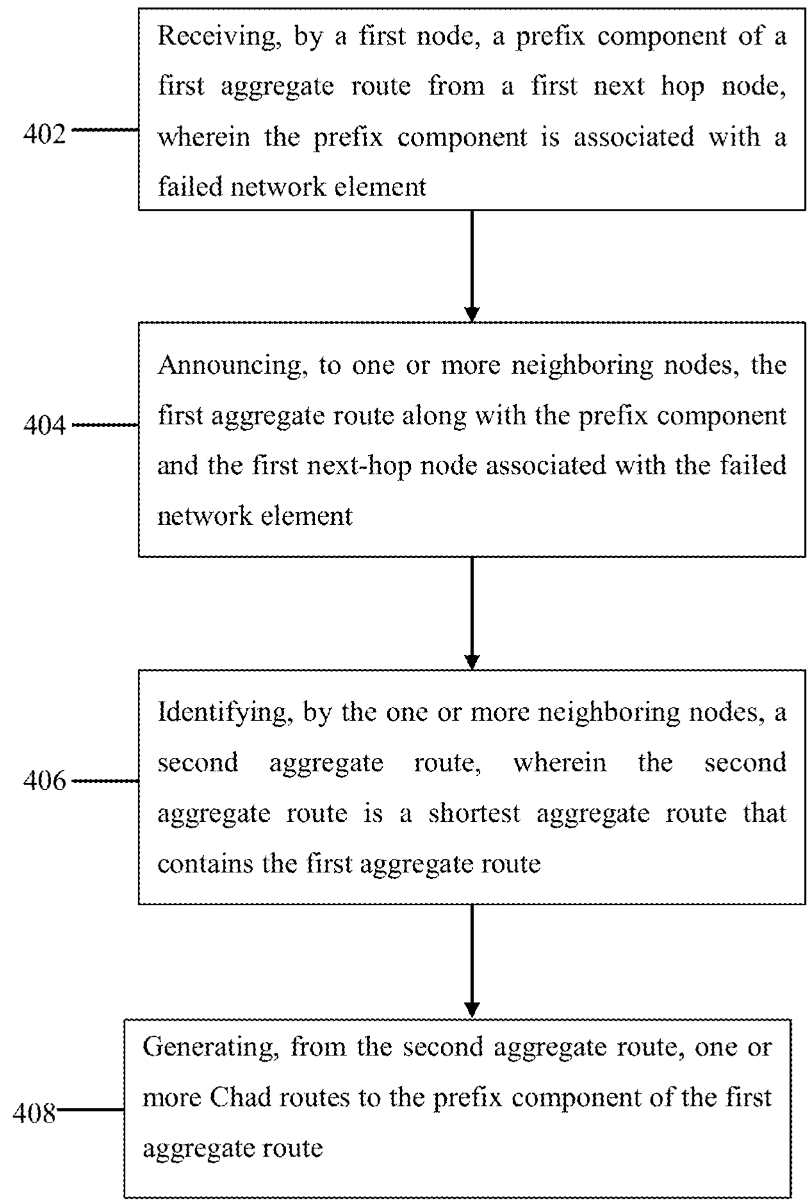
FIG. 4 is an example method of implementing route aggregation in clos network without susceptibility to route black holes in event of link failure, according to one aspect of the present disclosure.

FIG. 4 provides a flowchart for example workflow in accordance to some example embodiments of the present disclosure. With reference to FIG. 4, at step 402 a prefix component of an aggregate route that is associated with a failed network element is received by a northbound node from one or more next hop nodes in the southbound direction. At step 404 the receiving node advertises the unreachable prefix as a Hole-Punch route with a lower priority to one or more of its next hop node neighbors. The unreachable prefix is advertised with a Do-Not-Aggregate BGP community along with the aggregate route that was received. At step 406 the one or more neighbor nodes that receive the aggregate route along with the Hole-punch prefix advertisement will search in their respective routing tables, using for example a Radix tree approach for a Punch-Accept route that covers the unreachable prefix. The Punch-accept route with the longest netmask is then selected as the Punch-taken route by the one or more neighbor nodes receiving the Hole-punch route announcement. At step 408 the one or more neighbor nodes generate one or more Chad routes from the Punch-taken route that have a different next hop than the failed network component in Step 402. These Chad routes are then used to construct an ECMP for routing towards the unreachable prefix in a way that avoids the failed network element and instead uses all other nodes that can access the unreachable prefix.

In one example, the above process of FIG. 4 can be optimized so as to only be implemented with respect to one or more preferred/priority prefixes. For example, industrial, Remote Direct Memory Access and Deterministic Networking prefixes can be identified as preferred/priority prefixes for which the above disaggregation policies should be implemented per FIG. 4 while the implementation of the same may be skipped with respect to leaf nodes via which non-preferred prefixes are accessible.

With above description, the disclosure now turns to describing example device/system structure that can be used as one or more network nodes to implement functionalities of FIG. 4.

Figure 5:
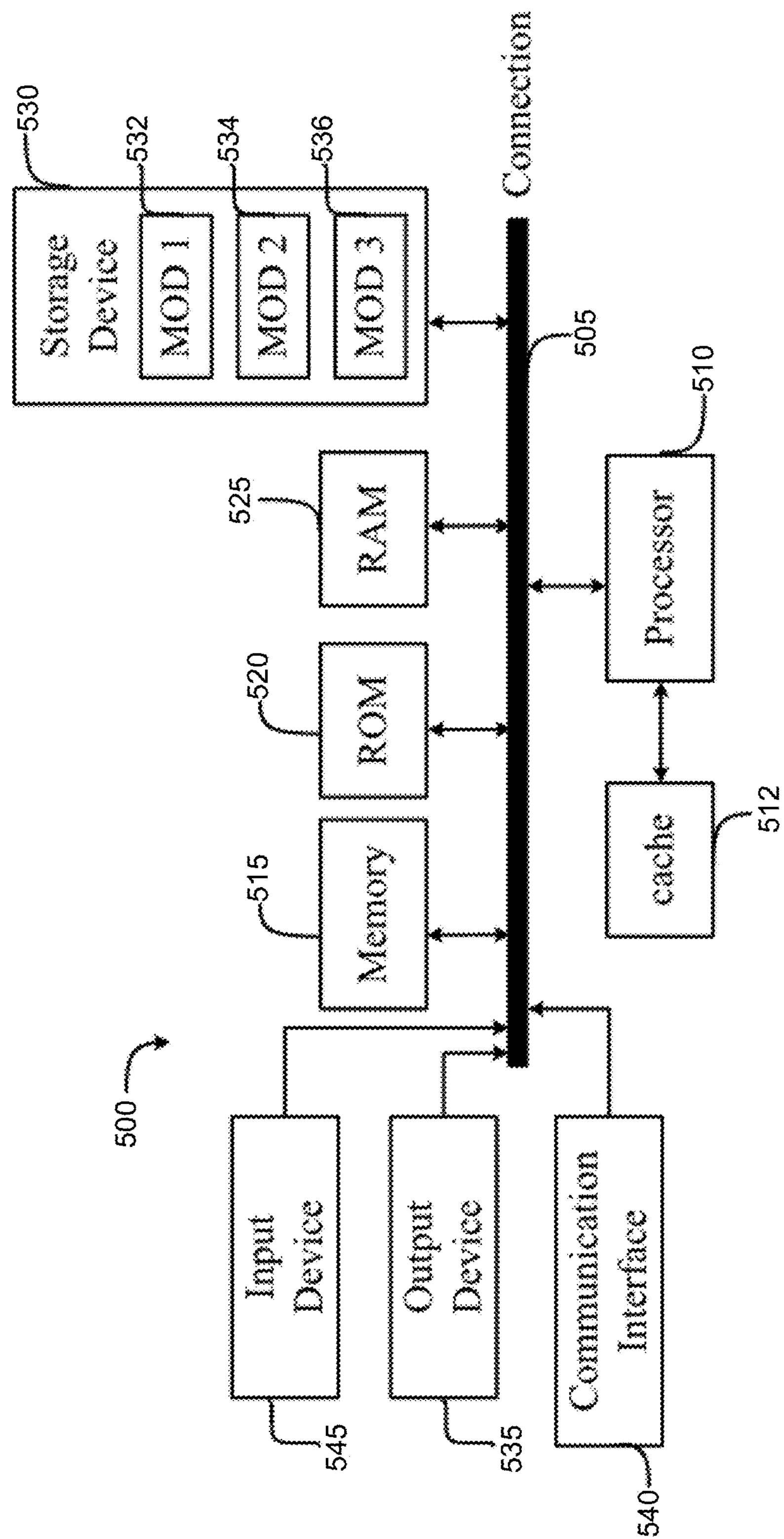
FIG. 5 illustrates an example network device in accordance with some example embodiments of the present disclosure.
Figure 6:
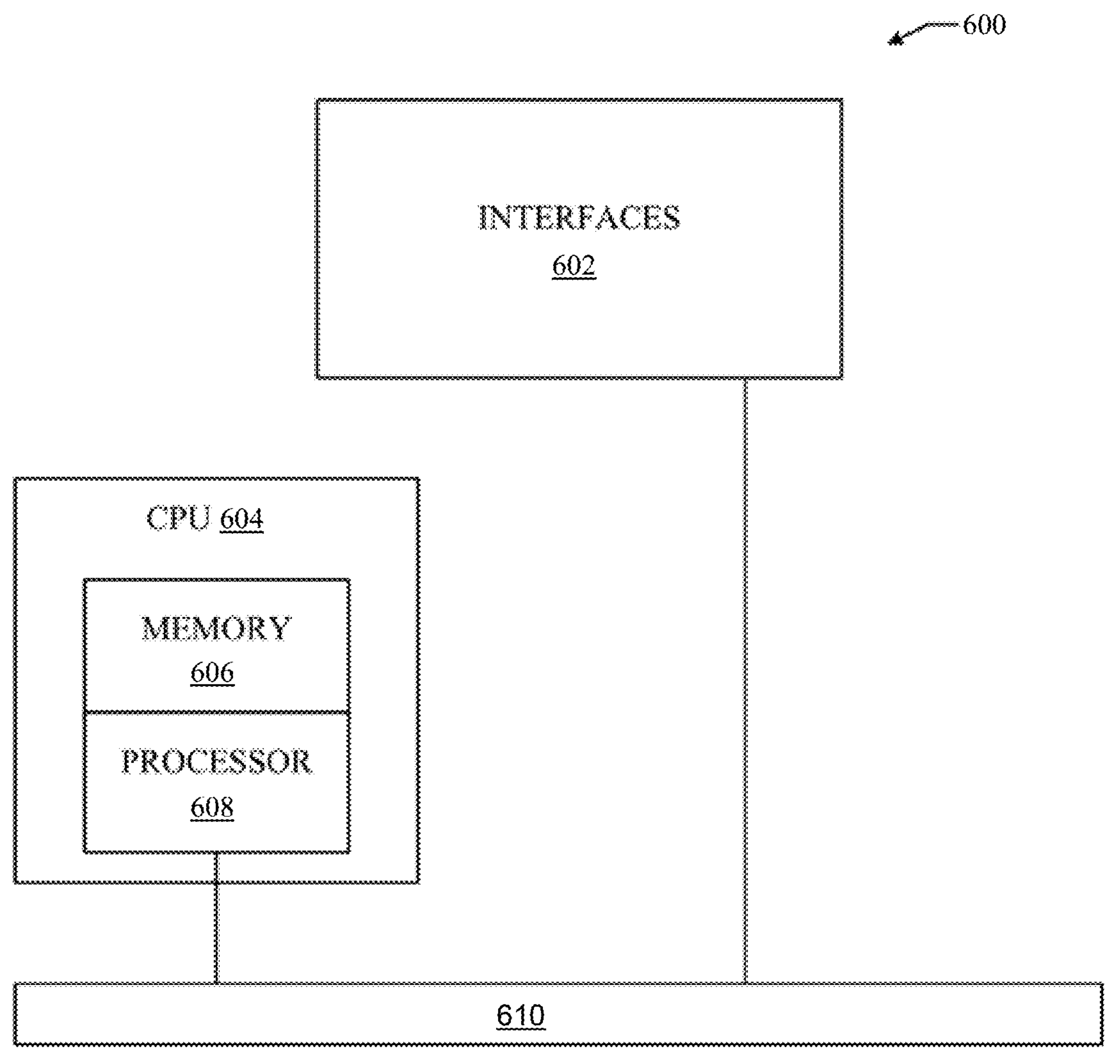
FIG. 6 illustrates an example architecture of a computing device, in accordance with some example embodiments of the present disclosure.

The disclosure now turns to FIGS. 5 and 6, which illustrate example architectures of computing and network devices, such as client computers, switches, routers, controllers, servers, and so forth.

FIG. 5 illustrates a computing system architecture 500 including components in electrical communication with each other using a connection 505, such as a bus. System 500 includes a processing unit (CPU or processor) 510 and a system connection 505 that couples various system components including the system memory 515, such as read-only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware or software service, such as service 1 532, service 2 534, and service 3 536 stored in storage device 530, configured to control the processor 510 as well as a special-purpose processor where software instructions are incorporated into the actual processor design. The processor 510 may be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read-only memory (ROM) 520, and hybrids thereof.

The storage device 530 can include services 532, 534, 536 for controlling the processor 510. Other hardware or software modules are contemplated. The storage device 530 can be connected to the system connection 505. In one aspect, a hardware module that performs a particular function can include the software component stored in a computer-readable medium in connection with the necessary hardware components, such as the processor 510, connection 505, output device 535, and so forth, to carry out the function.

FIG. 6 illustrates an example network device 600 suitable for performing switching, routing, assurance, and other networking operations. Network device 600 includes a central processing unit (CPU) 604, interfaces 602, and a connection 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. CPU 604 may include one or more processors 608, such as a processor from the INTEL X86 family of microprocessors. In some cases, processor 608 can be specially designed hardware for controlling the operations of network device 600. In some cases, a memory 606 (e.g., non-volatile RAM, ROM, TCAM, etc.) also forms part of CPU 604. However, there are many different ways in which memory could be coupled to the system. In some cases, the network device 600 can include a memory and/or storage hardware, such as TCAM, separate from CPU 604. Such memory and/or storage hardware can be coupled with the network device 600 and its components via, for example, connection 610.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto-processing, and management. By providing separate processors for the communications intensive tasks, these interfaces allow the master microprocessor 604 to efficiently perform routing computations, network diagnostics, security functions, etc.

Although the system shown in FIG. 6 is one specific network device of the present disclosure, it is by no means the only network device architecture on which the concepts herein can be implemented. For example, an architecture having a single processor that handles communications as well as routing computations, etc., can be used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC), which can be configured to perform routing, switching, and/or other operations. The ASIC can communicate with other components in the network device 600 via the connection 610, to exchange data and signals and coordinate various types of operations by the network device 600, such as routing, switching, and/or data storage operations, for example.

In some example embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionalities described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A method for Border Gateway Protocol route summarization in a Clos topology, the method comprising:

receiving, by a first node, a prefix component of a first aggregate route from a first next hop node, the prefix component associated with a failed network element and the first node is a northbound node to the first next hop node; and when the prefix component is identified as a priority prefix, announcing, to one or more neighboring nodes, the first aggregate route, the prefix component, and the first next hop node, wherein the one or more neighboring nodes are on a same tier as the first node in the Clos topology;

identifying, by the one or more neighboring nodes, a second aggregate route, the second aggregate route being a shortest aggregate route containing the first aggregate route, the one or more neighboring nodes searching routing table information to yield the second aggregate route after the announcing of the first aggregate route, the prefix component, and the first next hop node; and generating, from the second aggregate route, one or more Chad routes to the prefix component, the one or more Chad routes associated with one or more next hop nodes that are different from the first next hop node.

2. The method of claim 1, wherein the failed network element corresponds to one or more link failures southbound of the first node.

3. The method of claim 1, wherein the failed network element corresponds to one or more node failures southbound of the first node.

4. The method of claim 1, wherein the prefix component and the first next hop node are announced to the one or more neighboring nodes with a Hole-Punch and a Do-Not-Aggregate Border Gateway Protocol community.

5. The method of claim 1, wherein the second aggregate route is associated with a Punch-Accept community.

6. The method of claim 1, wherein the identifying of the second aggregate route includes searching a Radix tree for a Punch-Accept route closest to the prefix component.

7. The method of claim 1, wherein the one or more Chad routes have a prefix and a subnet mask corresponding to the prefix component, and one or more attributes corresponding to the second aggregate route.

8. The method of claim 1, wherein, the first node is a northern neighbor of the first next hop node within the Clos topology, and the prefix component is connected to the first next hop node and is accessible via the first node and at least one other northern neighbor of the first next hop node.

9. A system comprising:

one or more processors; and at least one computer-readable storage medium having stored therein instructions which, when executed by the one or more processors, cause the one or more processors to:

determine an unreachable prefix component of a first aggregate route received by a first network node from one or more first next hop nodes, wherein the first network node is a northbound node to the one or more first next hop nodes; and when the prefix component is identified as a priority prefix, announce, to one or more neighboring nodes, the first aggregate route, the unreachable prefix component, and the one or more first next hop nodes, wherein the one or more neighboring nodes are on a same tier as the first network node in a Clos topology;

identify, by the one or more neighboring nodes, a second aggregate route, the second aggregate route being a shortest aggregate route containing the first aggregate route, the one or more neighboring nodes searching routing table information to yield the second aggregate route after the first aggregate route, the prefix component, and the one or more first next hop nodes are announced; and generate, from the second aggregate route, one or more Chad routes to the unreachable prefix component, the one or more Chad routes associated with one or more next hop nodes that are different from the one or more next first next hop nodes.

10. The system of claim 9, wherein the unreachable prefix component corresponds to one or more link failures southbound of the first network node.

11. The system of claim 9, wherein the unreachable prefix component corresponds to one or more node failures southbound of the first network node.

12. The system of claim 9, wherein the unreachable prefix component and the one or more first next hop nodes are announced to the one or more neighboring nodes with a Hole-Punch and a Do-Not-Aggregate Border Gateway Protocol community.

13. The system of claim 9, wherein the second aggregate route is associated with a Punch-Accept community.

14. The system of claim 9, wherein the one or more processors are configured execute the instructions to identify the second aggregate route by searching a Radix tree for a Punch-Accept route closest to the unreachable prefix component.

15. The system of claim 9, wherein the one or more Chad routes have a prefix and a subnet mask corresponding to the prefix component, and one or more attributes corresponding to the second aggregate route.

16. One or more non-transitory computer-readable media comprising computer-readable instructions which, when executed by one or more processors of a network node, cause the network node to:

determine an unreachable prefix component of a first aggregate route received by a first network node from one or more first next hop nodes, wherein the first network node is a northbound node to the one or more first next hop nodes; and when the prefix component is identified as a priority prefix, announce, to one or more neighboring nodes, the first aggregate route, the unreachable prefix component, and the one or more first next hop nodes, wherein the one or more neighboring nodes are on a same tier as the first network node in a Clos topology;

identify, by the one or more neighboring nodes, a second aggregate route, the second aggregate route being a shortest aggregate route that contains the first aggregate route, the one or more neighboring nodes searching routing table information to yield the second aggregate route after the first aggregate route, the prefix component, and the one or more first next hop nodes are announced; and generate, from the second aggregate route, one or more Chad routes to the unreachable prefix component, the one or more Chad routes associated with one or more next hop nodes that are different from the one or more next first next hop nodes.

17. The one or more non-transitory computer-readable media of claim 16, wherein the unreachable prefix component and the one or more first next hop nodes are announced to the one or more neighboring nodes with a Hole-Punch and a Do-Not-Aggregate Border Gateway Protocol community.

18. The one or more non-transitory computer-readable media of claim 16, wherein the second aggregate route is associated with a Punch-Accept community.

19. The one or more non-transitory computer-readable media of claim 16, wherein execution of the computer-readable instructions by the one or more processors cause the network node to identify the second aggregate route by searching a Radix tree for a Punch-Accept route closest to the unreachable prefix component.

20. The one or more non-transitory computer-readable media of claim 16, wherein the one or more Chad routes have a prefix and a subnet mask corresponding to the unreachable prefix component, and one or more attributes corresponding to the second aggregate route.

* * * * *